United States Patent [19]
Monk

[11] Patent Number: 6,161,369
[45] Date of Patent: Dec. 19, 2000

[54] ROTATIONAL RAKING DEVICE

[76] Inventor: Guerdon M. Monk, 17704 Drayton St., Springhill, Fla. 34610

[21] Appl. No.: 09/209,813

[22] Filed: Dec. 11, 1998

[51] Int. Cl.[7] ...................................................... A01D 7/02
[52] U.S. Cl. .................................... 56/400.03; 56/400.04; 56/400.11; 56/400.13
[58] Field of Search ........................... 56/400.02, 400.04, 56/400.03, 400.16, 400.21, 400.11, 400.01, 400.13; 172/21, 22

[56] References Cited

U.S. PATENT DOCUMENTS

| | | | |
|---|---|---|---|
| 879,759 | 2/1908 | French | 56/400.03 |
| 1,939,385 | 12/1933 | Burr | 56/400.02 |
| 2,546,620 | 3/1951 | Van Ness | 56/400.02 |
| 2,552,382 | 5/1951 | Root | 56/400.02 |
| 2,700,783 | 2/1955 | Parker et al. | 56/400.02 |
| 2,826,034 | 3/1958 | Feuerlein | 56/400.02 |
| 3,545,187 | 12/1970 | Whitney | 56/400.02 |
| 3,591,883 | 7/1971 | Armstrong | 56/400.02 |
| 3,664,101 | 5/1972 | Hurlburt | 56/220 |
| 4,489,539 | 12/1984 | Fralish | 56/400.02 |
| 5,408,813 | 4/1995 | Haban et al. | 56/14.8 |
| 5,630,452 | 5/1997 | Schmid et al. | 141/199 |

FOREIGN PATENT DOCUMENTS

| | | | |
|---|---|---|---|
| 312524 | 9/1917 | Germany | 56/400.21 |
| 973993 | 11/1964 | United Kingdom | 56/400.02 |

*Primary Examiner*—Thomas B. Will
*Assistant Examiner*—Meredith C. Petravick

[57] ABSTRACT

A rotational raking device for coupling to a rotating device that rotates the raking device about a longitudinal axis for raking leaves and other loose debris of a lawn. The rotational raking device includes an elongate shaft with opposite ends and a longitudinal axis that extends between the ends. A pair of elongate first brackets each have an axis that extends between opposite ends thereof. Each of the brackets is coupled to the shaft. Each of the brackets has a plurality of spikes that extend outwardly from it. Also disclosed is a rotating device for rotating the raking device.

1 Claim, 3 Drawing Sheets

ROTATIONAL RAKING DEVICE

BACKGROUND OF THE INVENTION

1. Field of the Invention

The present invention relates to rakes and more particularly pertains to a new rotational raking device for coupling to a rotating device that rotates said raking device about a longitudinal axis for raking leaves and other loose debris of a lawn.

2. Description of the Prior Art

The use of rakes is known in the prior art. More specifically, rakes heretofore devised and utilized are known to consist basically of familiar, expected and obvious structural configurations, notwithstanding the myriad of designs encompassed by the crowded prior art which have been developed for the fulfillment of countless objectives and requirements. In particular, lawn brushes are often used to collect leaves and lawn debris that sits on top of the grass of a lawn. However, the soft bristles of the brush do not get down between the grass blades to lift dead grass that has been matted to the ground by the elements. Nor are they effective at lifting pine needles from the ground.

Known prior art includes U.S. Pat. No. 5,235,799; U.S. Pat. No. 5,142,855; U.S. Pat. No. 3,374,614; U.S. Pat. No. 4,063,407; U.S. Pat. No. Des. 353,980; and U.S. Pat. No. 2,637,261.

While these devices fulfill their respective, particular objectives and requirements, the aforementioned patents do not disclose a new rotational raking device. The inventive device includes an elongate shaft with opposite ends and a longitudinal axis that extends between the ends. A pair of elongate first brackets each have an axis that extends between opposite ends thereof. Each of the brackets is coupled to the shaft. Each of the brackets has a plurality of spikes that extend outwardly from it. Also disclosed is a rotating device for rotating the raking device.

In these respects, the rotational raking device according to the present invention substantially departs from the conventional concepts and designs of the prior art, and in so doing provides an apparatus primarily developed for the purpose of coupling to a rotating device that rotates said raking device about a longitudinal axis for raking leaves and other loose debris of a lawn.

SUMMARY OF THE INVENTION

In view of the foregoing disadvantages inherent in the known types of rakes now present in the prior art, the present invention provides a new rotational raking device construction wherein the same can be utilized for coupling to a rotating device that rotates said raking device about a longitudinal axis for raking leaves and other loose debris of a lawn.

The general purpose of the present invention, which will be described subsequently in greater detail, is to provide a new rotational raking device apparatus and method which has many of the advantages of the rakes mentioned heretofore and many novel features that result in a new rotational raking device which is not anticipated, rendered obvious, suggested, or even implied by any of the prior art rakes, either alone or in any combination thereof.

To attain this, the present invention generally comprises an elongate shaft with opposite ends and a longitudinal axis that extends between the ends. A pair of elongate first brackets each have an axis that extends between opposite ends thereof. Each of the brackets is coupled to the shaft. Each of the brackets has a plurality of spikes that extend outwardly from it. Also disclosed is a rotating device for rotating the raking device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rotational raking device apparatus and method which has many of the advantages of the rakes mentioned heretofore and many novel features that result in a new rotational raking device which is not anticipated, rendered obvious, suggested, or even implied by any of the prior art rakes, either alone or in any combination thereof.

It is another object of the present invention to provide a new rotational raking device which may be easily and efficiently manufactured and marketed.

It is a further object of the present invention to provide a new rotational raking device which is of a durable and reliable construction.

An even further object of the present invention is to provide a new rotational raking device which is susceptible of a low cost of manufacture with regard to both materials and labor, and which accordingly is then susceptible of low prices of sale to the consuming public, thereby making such rotational raking device economically available to the buying public.

Still yet another object of the present invention is to provide a new rotational raking device which provides in the apparatuses and methods of the prior art some of the advantages thereof, while simultaneously overcoming some of the disadvantages normally associated therewith.

Still another object of the present invention is to provide a new rotational raking device for coupling to a rotating device that rotates said raking device about a longitudinal axis for raking leaves and other loose debris of a lawn.

Yet another object of the present invention is to provide a new rotational raking device which includes an elongate shaft with opposite ends and a longitudinal axis that extends between the ends. A pair of elongate first brackets each have an axis that extends between opposite ends thereof. Each of the brackets is coupled to the shaft. Each of the brackets has a plurality of spikes that extend outwardly from it. Also disclosed is a rotating device for rotating the raking device.

Still yet another object of the present invention is to provide a new rotational raking device that is more effective for picking up pine needles than a lawn brush.

Even still another object of the present invention is to provide a new rotational raking device that aerates the lawn as it moves over the lawn.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
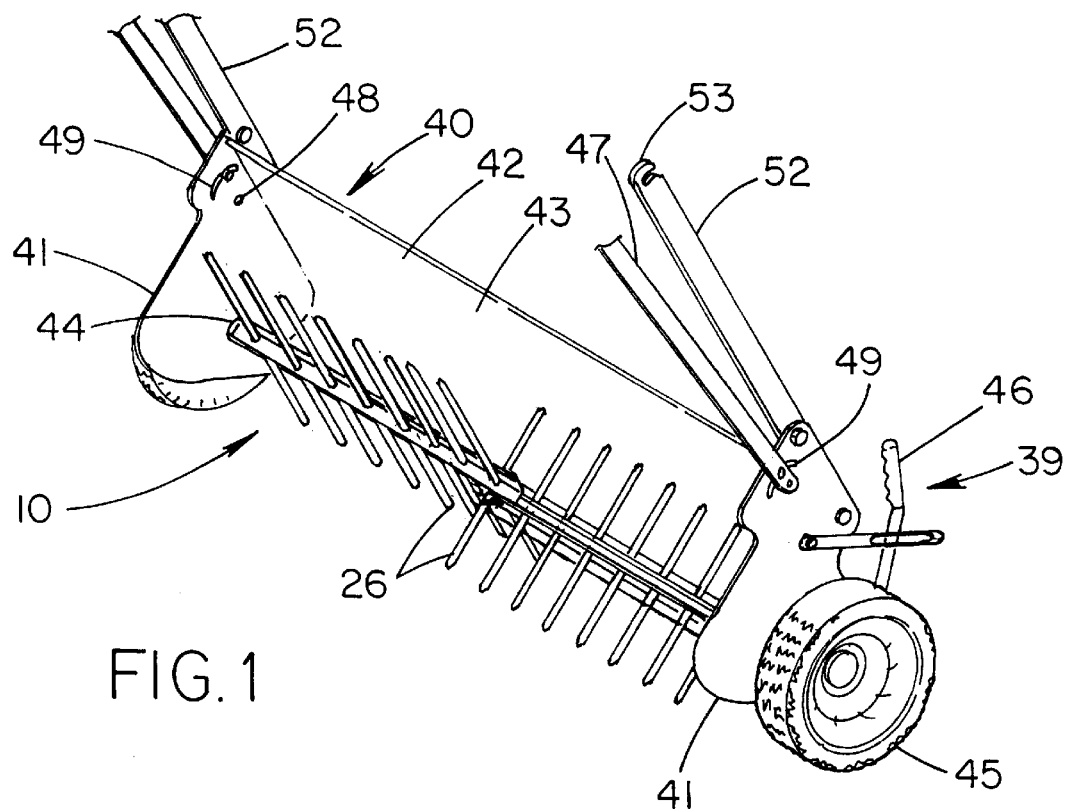
FIG. 1 is a schematic perspective view of a new rotational raking device according to the present invention.
Figure 2:
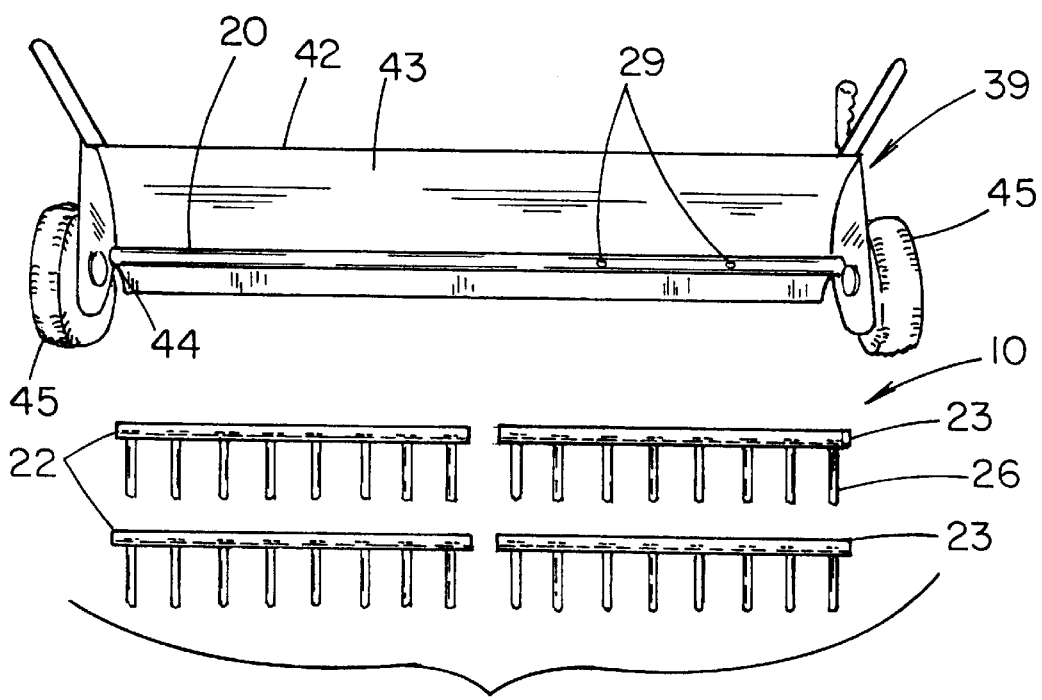
FIG. 2 is a schematic exploded view of the present invention.
Figure 3:
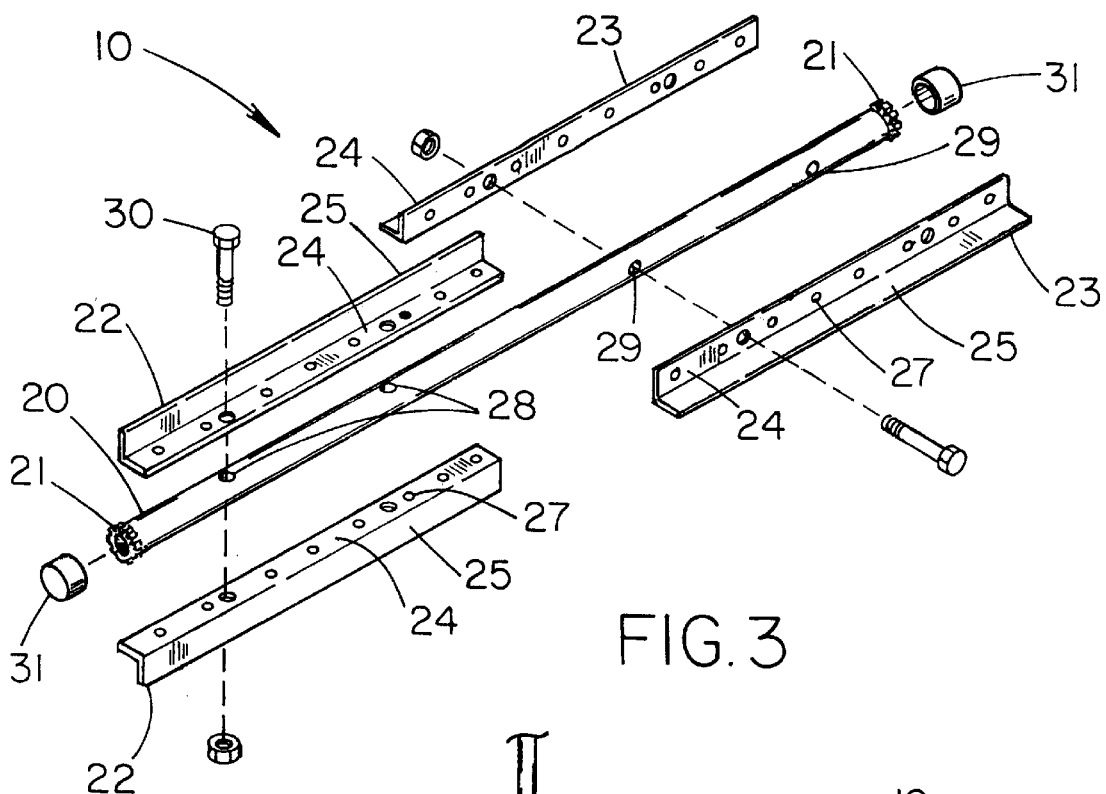
FIG. 3 is a schematic exploded view of the present invention.
Figure 4:
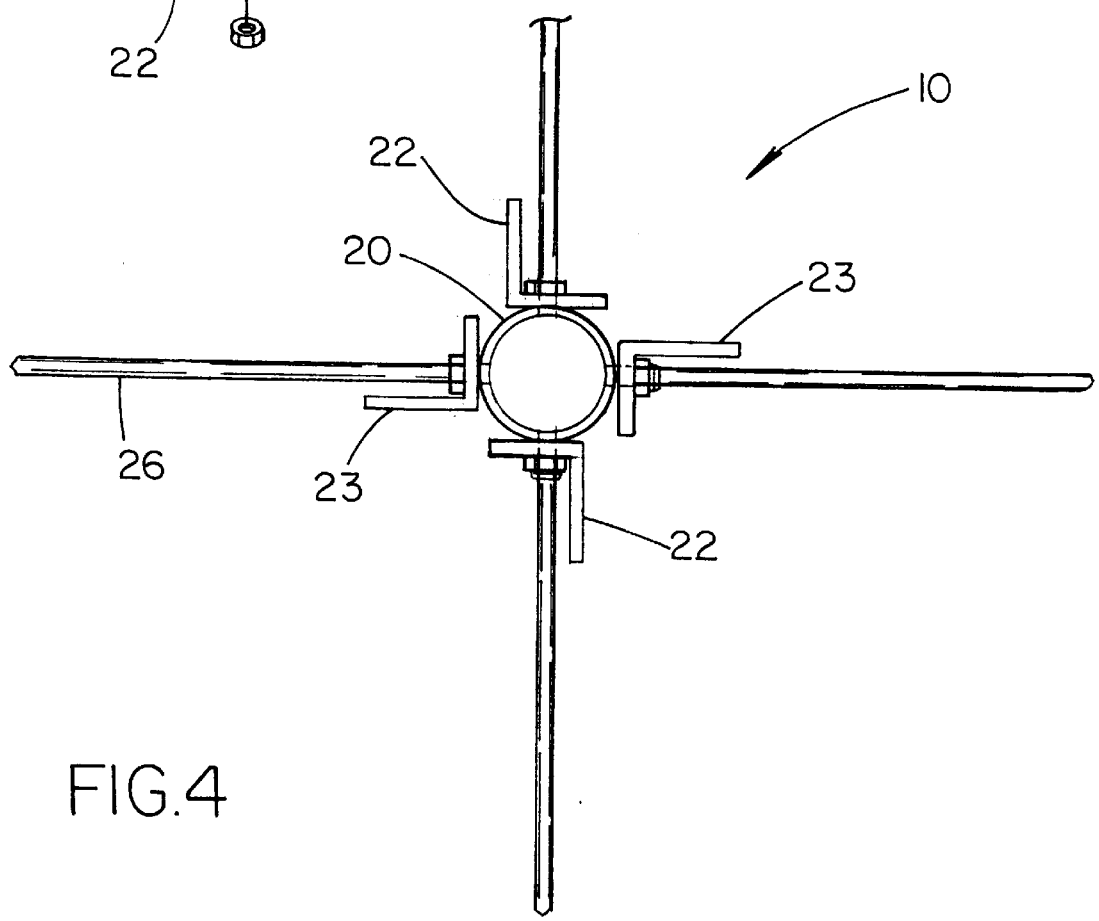
FIG. 4 is a schematic side view of the present invention.
Figure 5:
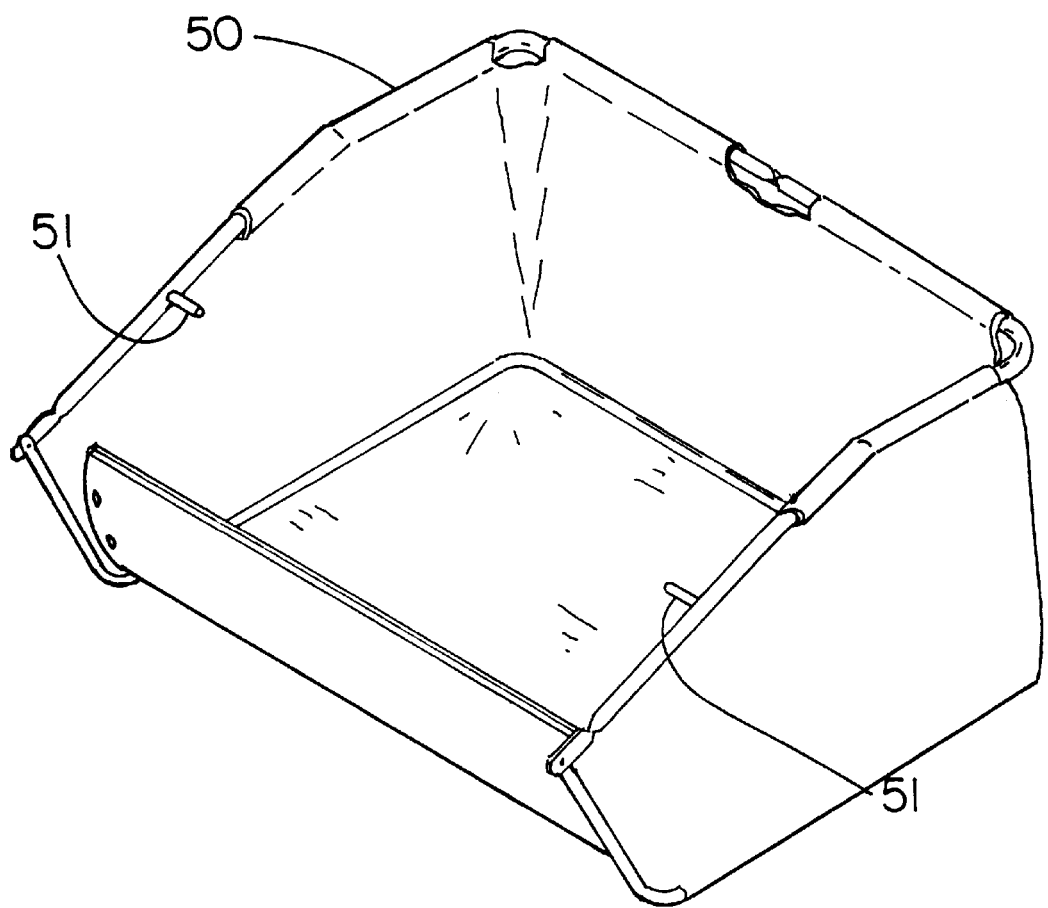
FIG. 5 is a schematic perspective view of a hopper bag of the present invention.

With reference now to the drawings, and in particular to FIGS. 1 through 5 thereof, a new rotational raking device embodying the principles and concepts of the present invention and generally designated by the reference numeral 10 will be described.

As best illustrated in FIGS. 1 through 5, the rotational raking device 10 generally comprises an elongate shaft 20 with opposite ends and a longitudinal axis that extends between the ends. A pair of elongate first brackets 22 each have an axis that extends between opposite ends thereof. Each of the brackets 22 is coupled to the shaft 20. Each of the brackets 22 has a plurality of spikes 26 that extend outwardly from it.

Preferably, the shaft 20 is tubular has a pair of gears 21 coupled to the ends thereof for engaging a rotating device 39, such as the rotating device 39 discussed below.

Also preferably, a pair of elongate first brackets 22 and a pair of elongate second brackets 23 are coupled to the shaft 20. Each of the brackets 22,23 has an axis that extends between opposite ends thereof. More preferably, each of the brackets 22,23 has a generally L-shaped transverse cross section taken perpendicular to its axis. Each of the brackets 22,23 has a first portion 24 and a second portion 25. The first portion 24 of each of the brackets 22,23 is coupled to the shaft 20. The second portion 25 of each of the brackets extends substantially perpendicular from the first portion 24.

The first portion 24 of each of the brackets 22,23 has a plurality of equidistantly spaced rigid spikes 26 that extend outwardly from it. Ideally, the spikes 26 of the first portion 24 of the first brackets 22 lie on a first plane that extends through the axis of the shaft 20. The spikes 26 of the first portions 24 of the second brackets 23 lie on a second plane that extends through the axis of the shaft 20 and is oriented substantially perpendicular to the first plane. Most ideally, the spikes 26 are inserted in a plurality of holes 27 that extend through the first portions 24 of the brackets so that the spikes 26 are less likely to break off.

The second portion 25 of each of the brackets 22,23 is positioned towards the spikes 26 to permit the to spikes 26 to flex a bit but prevents the spikes 26 from flexing too much by abutting the spikes 26 as they flex to keep them from bending.

Ideally, a free end of each of the spikes 26 is pointed to aerate the ground as the raking device is used.

Preferably, the shaft 20 has an adjacent pair of first bores 28 and an adjacent pair of second bores 29 extending through it. The first pair of bores extends along the first plane. The second pair of bores extends along the second plane. Each of the first portions 24 of the brackets has a pair of apertures 44 through it that are aligned with the first bores 28 of the shaft 20. The aperture 44s of the second brackets 23 are aligned with the second bores 29 of the shaft 20. A plurality of threaded fasteners 30 for couple the brackets to the shaft 20. The threaded fasteners 30 extend through the apertures 44 of an associated pair of brackets and the bores of the shaft 20.

More preferably, a pair of end caps 31 close the ends of the shaft 20 to keep debris out of the inside of the shaft 20. Ideally, each of the end caps 31 is transparent to permit viewing of the lumen of the shaft 20 to see if any bends have occurred which are not visible from an inspection of the outer surface due to the brackets partially blocking the view of the shaft 20.

A length of each of the spikes 26 is defined between opposite ends thereof. The preferred length of each of the spikes 26 is between about 3 and 5 inches, ideally about 4 inches. A length of the shaft 20 is defined between the ends thereof. The preferred length of the shaft 20 is between about 12 and 48 inches, ideally about 18 inches. A length of each of the brackets is defined along the axis thereof. The preferred length of each of the brackets is between about 5 and 48 inches, ideally about 10 inches so that the first and second brackets 22,23 overlap towards the center of the shaft 20, as shown in FIG. 1. The preferred width of each of the second portions 25 of the brackets taken perpendicular to the axes of the brackets is between about ¼ and ½ inch, ideally about ¾ inch. Ideally, the first portions 24 of the brackets have the same dimensions as the associated second portions 25.

The preferred rotating device 39 comprises a housing 40 that has opposed lateral sides 41 and a cross panel 42 that extends between the lateral sides 41. The cross panel 42 has an axis that extends between the lateral sides 41. The cross panel 42 has a generally C-shaped transverse cross section taken generally perpendicular to the axis. The cross panel 42 has a generally concave inner face 43.

Each of the lateral sides 41 has an aperture 44 that extends through it inwardly of the inner face 43 of the cross panel 42. The shaft 20 extends through the apertures 44 with the gears 21 on the outside of the housing 40. A pair of wheels 45 are positioned adjacent the lateral sides 41 of the housing 40. The wheels 45 rotatably engage the gears 21 of the shaft 20 such that the wheels 45 rotate the shaft 20 in an opposite direction as the wheels 45.

A height adjustment means 46 is coupled to the housing 40 to adjust a height of the housing 40 relative to the wheels 45. Height adjustment means for this general type of rotating device are known in the art, and therefore, no discussion of the height adjustment means 46 will be made.

Each of the lateral sides 41 of the housing 40 has a handle hole 48 and a handle slot 49 to which a handle 47 may be mounted, such as a handle 47 having an inverted U-shape. The handle slot 49 permits pivotal adjustment of the handle 47 to accommodate users of varying heights.

A hopper bag 50 is detachably coupleable to the housing 40. The hopper bag 50 has a bottom, a pair of opposed sidewalls, a rear wall, a curved front wall with a generally C-shaped transverse cross section taken parallel the sidewalls of the hopper bag 50, and an interior. The hopper bag 50 has a pair of coupling pegs 51 that extend inwardly of the sidewalls of the hopper bag 50. Each of the lateral sides 41 of the housing 40 has a mounting bar 52 that extends from an upper portion thereof. Each of the mounting bar 52 has a hooked end 53 for engaging the coupling pegs 51 of the hopper bag 50.

In use, the rotating device is pushed forward to rotate the wheels 45 along the ground. The wheels 45 rotate the shaft 20 in the opposite direction, pushing debris forward and lifting it up along the inner face 43 of the housing 40 and depositing it in the hopper bag 50. The rigid spikes 26 of the raking device penetrate deeper into the grass to remove dead grass and debris lying against the ground, and is especially effective when used to collect pine needles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A raking system for raking leaves and other loose debris of a lawn comprising, in combination:

a housing having opposed lateral sides and a cross panel extending between said lateral sides, said cross panel having an axis extending between said lateral sides, said cross panel having a generally C-shaped transverse cross section taken generally perpendicular to said axis;

said cross panel having a generally concave inner face;

each of said lateral sides having an aperture extending therethrough inwardly of said inner face of said cross panel;

an elongate shaft having opposite ends and a longitudinal axis extending between said ends, said shaft extending through said apertures of said lateral sides of said housing, said shaft having a pair of gears coupled to said ends thereof;

a pair of wheels being positioned adjacent said lateral sides of said housing, said wheels rotatably engaging said gears of said shaft such that said wheels rotate said shaft in an opposite direction as said wheels;

a pair of elongate first brackets and a pair of elongate second brackets being coupled to said shaft, each of said brackets having an axis extending between opposite ends thereof;

each of said brackets having a generally L-shaped transverse cross section taken perpendicular to said axis thereof, each of said brackets having a first portion and a second portion, said first portion of each of said brackets being coupled to said shaft, said second portion of each of said brackets extending substantially perpendicular from said first portion;

said first portion of each of said brackets having a plurality of equidistantly spaced rigid spikes extending outwardly therefrom, said spikes of said first portion of said first brackets lying on a first plane extending through said axis of said shaft, said spikes of said first portion of said second brackets lying on a second plane extending through said axis of said shaft and being oriented substantially perpendicular to said first plane;

wherein said spikes are inserted in a plurality of holes extending through said first portions of the brackets;

said second portion of each of said brackets being positioned towards said spikes;

wherein a free end of each of said spikes is pointed;

said shaft having an adjacent pair of first bores and an adjacent pair of second bores extending therethrough, said first pair of bores extending along said first plane, said second pair of bores extending along said second plane;

each of said first portions of said brackets having a pair of apertures therethrough, said apertures of said first brackets being aligned with said first bores of said shaft, said apertures of said second brackets being aligned with said second bores of said shaft;

a plurality of threaded fasteners for coupling said brackets to said shaft, said threaded fasteners extending through said apertures of an associated pair of said brackets and said bores of said shaft;

a pair of end caps closing said ends of said shaft, each of said end caps being transparent;

a height adjustment means being coupled to said housing for adjusting a height of said housing relative to said wheels;

each of said lateral sides of said housing having a handle hole and a handle slot for mounting a handle thereto, said handle slot permitting pivotal adjustment of said handle;

a hopper bag being detachably coupleable to said housing, said hopper bag having a bottom, a pair of opposed sidewalls, a rear wall, a curved front wall having a generally C-shaped transverse cross section taken parallel said sidewalls of said hopper bag, and an interior;

said hopper bag having a pair of coupling pegs extending inwardly of said sidewalls of said hopper bag;

each of said lateral sides of said housing having a mounting bar extending from an upper portion thereof, each of said mounting bars having a hooked end for engaging said coupling pegs of said hopper bag;

a length of each of said spikes being defined between opposite ends thereof, wherein said length of each of said spikes is about 4 inches;

a length of said shaft being defined between said ends thereof, wherein said length of said shaft is about 18 inches;

a length of each of said brackets being defined along said axis thereof, wherein said length of each of said brackets is about 10 inches; and wherein a width of each of said second portions of said brackets taken perpendicular to said axes of said brackets is about ¾ inch.

* * * * *